(12) United States Patent
Bird

(10) Patent No.: US 6,519,245 B1
(45) Date of Patent: Feb. 11, 2003

(54) COMMUNICATION SYSTEM HAVING DEDICATED TIME SLOTS FOR SELECTION SIGNALS

(75) Inventor: David G. Bird, Greensboro, NC (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/228,310

(22) Filed: Jan. 11, 1999

(51) Int. Cl.[7] ............................................. H04B 7/212
(52) U.S. Cl. ..................... 370/347; 370/337; 370/348; 455/525
(58) Field of Search .............................. 370/347, 328, 370/329, 330, 337, 348, 294; 455/450, 456, 524, 525, 502

(56) References Cited

U.S. PATENT DOCUMENTS

| | | | | |
|---|---|---|---|---|
| 5,367,524 A | | 11/1994 | Rideout, Jr. et al. ..... | 370/104.1 |
| 5,396,647 A | | 3/1995 | Thompson et al. ......... | 455/33.2 |
| 5,737,330 A | * | 4/1998 | Fulthorp et al. ............ | 370/346 |
| 5,809,430 A | * | 9/1998 | D'Amico .................... | 455/525 |
| 5,832,368 A | * | 11/1998 | Nakano et al. ............... | 455/63 |
| 5,844,898 A | * | 12/1998 | Tanoue ....................... | 370/332 |
| 5,881,059 A | * | 3/1999 | Deschaine et al. .......... | 370/337 |
| 5,995,836 A | * | 11/1999 | Wijk et al. .................. | 455/436 |
| 6,167,281 A | * | 12/2000 | Sugi ........................... | 455/502 |

* cited by examiner

Primary Examiner—Edward F. Urban
Assistant Examiner—Erika A. Gary
(74) Attorney, Agent, or Firm—David R. Gildea

(57) ABSTRACT

A communication system having hubs and mobile units where a mobile unit uses selection signals from hubs during dedicated time slots for selecting a particular hub for communication during operational time slots. The hubs communicate on respective channels. The mobile units communicate with a particular hub on the channel associated with that hub. Each hub transmits a selection signal during a time slot that is dedicated for the selection signal from that hub. The mobile units base their selection of hub upon a comparison of the error rates of the respective selection signals and then communicate with the selected hub during with operational signals during the operational time slots. Certain message data is included in the selection signal from all the hubs in order to increase the reliability that the message data will be received by the mobile units. The certain message data includes precise positioning global positioning system (PPGPS) information for enabling mobile units equipped with GPS receivers to determine their respective geographical locations.

20 Claims, 6 Drawing Sheets

COMMUNICATION SYSTEM HAVING DEDICATED TIME SLOTS FOR SELECTION SIGNALS

BACKGROUND OF THE INVENTION

1. Field of the Invention

The invention relates generally to communication systems and more particularly to a communication system having hubs and mobile units using dedicated and operational time slots where a mobile unit receives selection signals from the hubs during the dedicated time slots for selecting a particular hub and then communicates with that hub during the operational time slots.

2. Description of the Prior Art

Many wireless communication systems have been proposed or are in use where mobile transceivers communicate with hub transceivers. A commonly known example of such system is a cellular telephone system having mobile cellular phone transceivers in communication with hub or cell site transceivers. The cell site transceivers for the cellular telephone systems are geographically spaced at fixed locations with minimum overlap for signal coverage for populated areas throughout the world. When more than one cell site transceiver is within range of a mobile cellular phone, the system decides which cell site communicates with the mobile phone based at least partially on the signal strength from the mobile phone at each of the in-range cell sites. A great deal of inventive effort and elaborate decision making software is used by the cell sites for determining the particular cell site and particular channel of the cell site transceiver for communicating with a particular mobile transceiver and when the mobile transceiver is to be handed off to another cell site or channel. Obviously, given the popularity of cellular phones, such systems work well for their primary application of allowing individuals to use the worldwide telephone system to talk to each other while at least one of the individuals is mobile. However, cellular phone systems are optimized for continuous voice communications as opposed to data burst communication. Also, cellular phone systems are not optimum for applications where only a few cell sites or hub transceivers are required such as a communication system at a construction or mining site for communicating data in bursts with mobile transceivers on mobile machinery such as bulldozers, shovels, cranes, dump trucks, and the like. One limitation of existing cellular systems for such applications is that the cell sites require relatively expensive computing power in order to run the decision making software for handing off mobile transceivers from one hub to another. Another limitation for applications having many mobile machine units that need to transmit occasional data bursts is that relatively few signals from each mobile transceiver are available to the hubs for measuring signal strength from that mobile transceiver. Another limitation is that the cell sites in cellular telephone systems are deliberately located in order to minimize signal overlap, thereby minimizing the opportunity for using redundant transmission for improving the reliability of especially selected important message information that is generally needed by the mobile machine units by transmitting that information from more than one hub to each of the mobile units.

SUMMARY OF THE INVENTION

It is therefore an object of the present invention to provide a communication system where certain message information is transmitted from each of several hubs in order to improve the reliability of its reception by mobile transceivers.

Another object of the present invention is for a mobile transceiver to use selection signals in dedicated time slots from hubs in order to select a particular one of the hubs with which to communicate.

Briefly, in a preferred embodiment, the communication system of the present invention includes at least two hubs for transmitting selection signals and receiving and transmitting operational signals; and at least one mobile unit for receiving the selection signals for selecting a particular one of the hubs and then communicating with the selected hub with the operational signals. The system organizes time into non-overlapping time slots having dedicated time slots for the selection signals and operational time slots for the operational signals. Each hub transmits a selection signal during a dedicated time slot that is allocated to the selection signal from that hub. The mobile units receive the selection signals during the dedicated time slots and select the particular hub with which to communicate based upon data error rates in the respective selection signals. Each of the hubs has a channel for transmitting its selection signal and receiving and transmitting operational signals. The mobile units tune to the respective channels for receiving the selection signals during the dedicated time slots and then communicating with the selected hub with the operational signals during the operational time slots. Each of the selection signals from each of the hubs includes certain message data that is the same in all of the selection signals in order to increase the reliability of the mobile units receiving that data. Preferably, the certain message data includes precise positioning global positioning system (GPS) information for enabling mobile units equipped with GPS receivers to determine their geographical locations. Of course, the use of a dedicated time slot for a selection signal for each hub imposes time overhead on the system. However, for systems having only a few hubs, the present invention has several advantages over other systems.

An advantage of the present invention is that the reliability of communicating selected message data from the hubs to the mobile units is improved by transmitting the message data in the selection signals from all of the hubs.

Another advantage of the present invention is that every hub provides a selection signal at frequent intervals, thereby providing a mobile unit with frequent information upon which to select a communication link with a particular hub.

Another advantage of the present invention is that mobile units can select a particular hub without the need of transmissions from the mobile unit to the hub.

Another advantage of the present invention is that processing power for selecting hubs is distributed among mobile units, thereby reducing the processing power required in the hubs.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
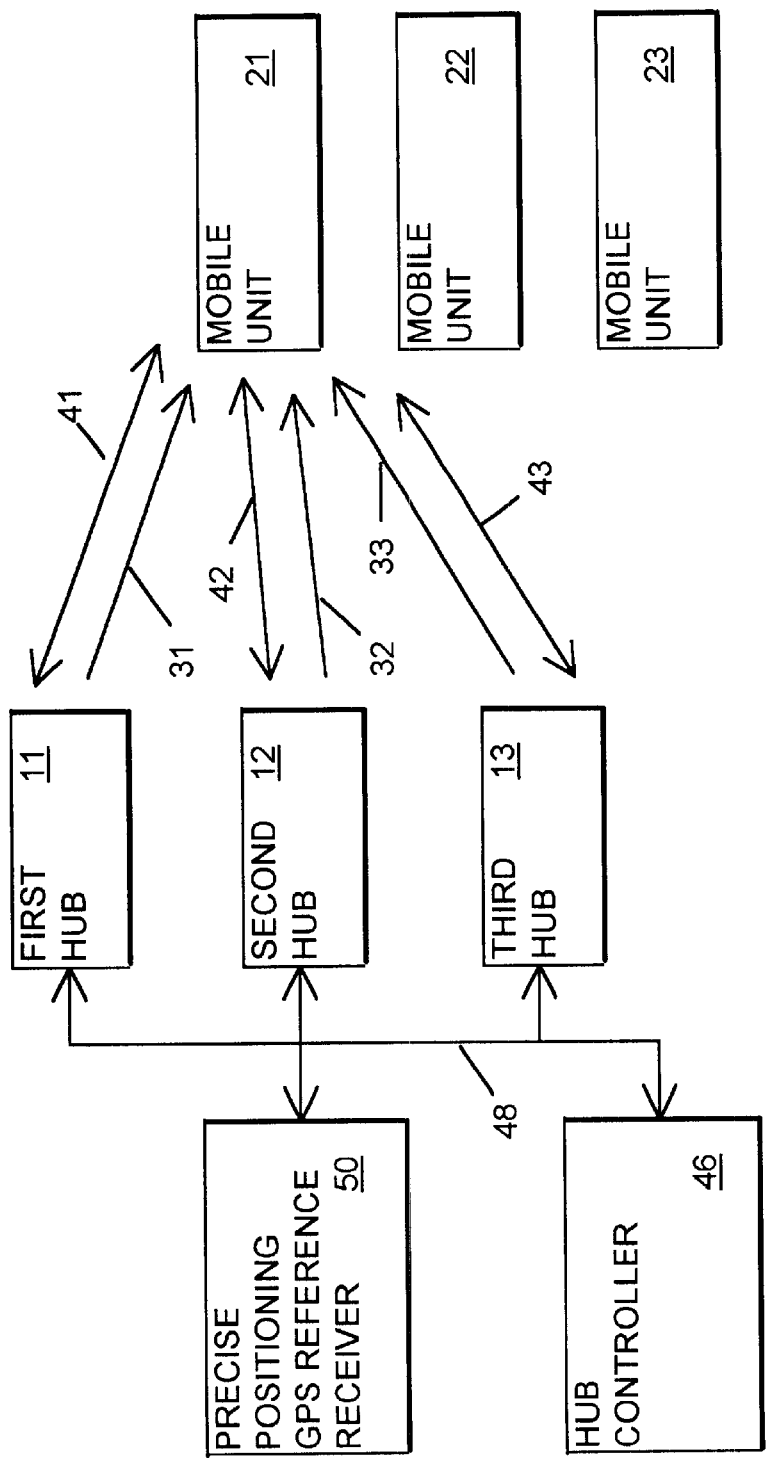
FIG. 1 is a block diagram of a communication system of the present invention.
Figure 4:
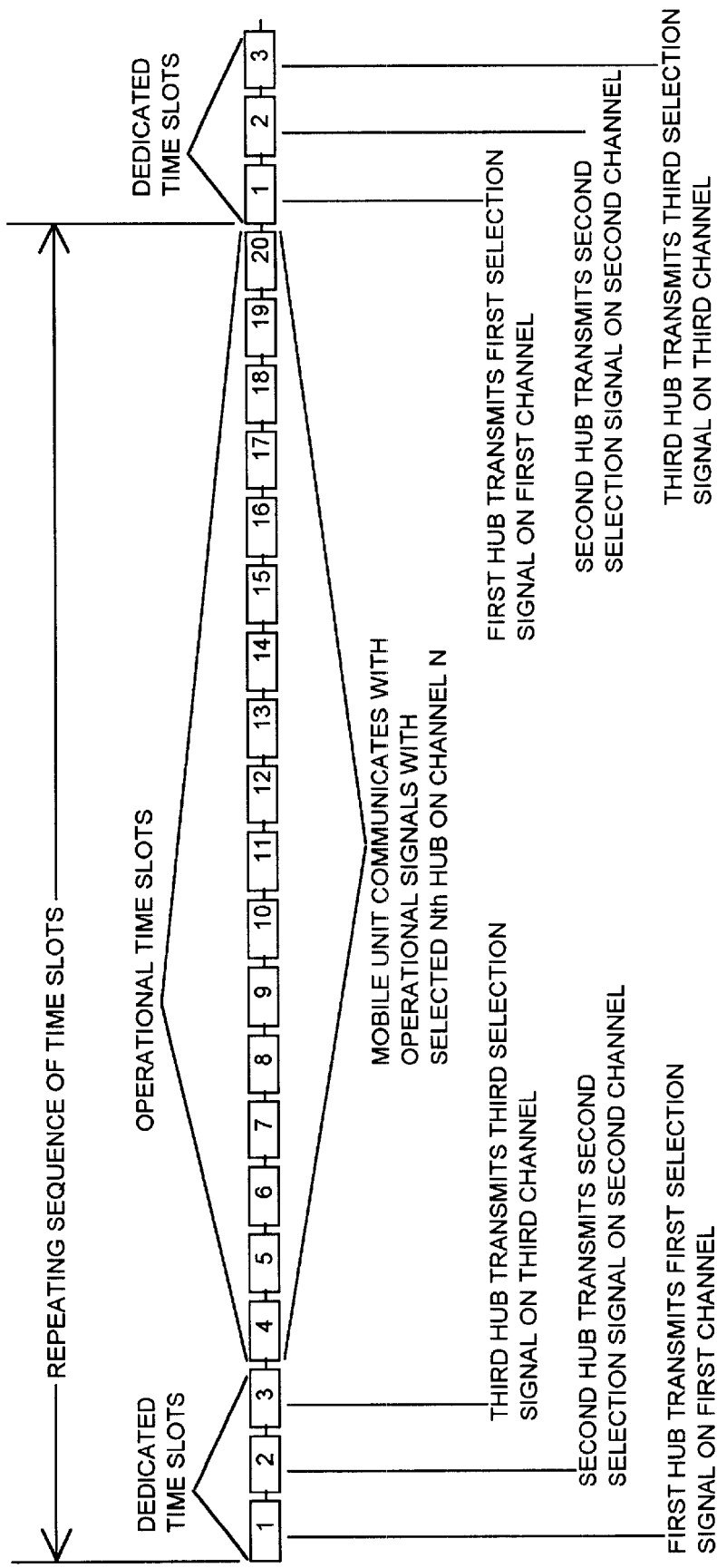
FIG. 4 is a time line of the signals exchanged in the communication system of FIG. 1.
Figure 5:
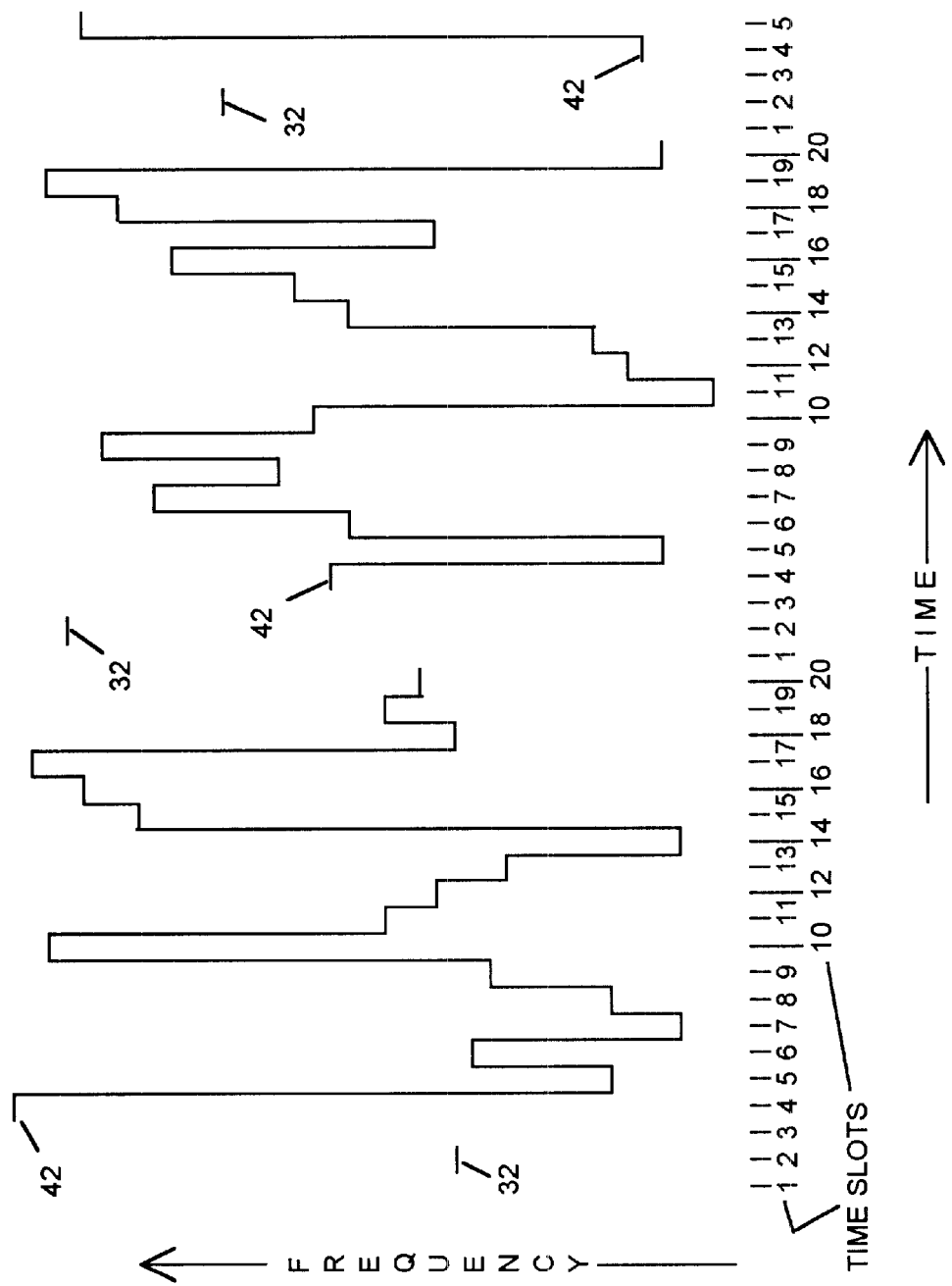
FIG. 5 is a frequency chart of the signals exchanged in the communication system of FIG. 1.

FIG. 1 is a block diagram of a communication system of the present invention referred to by the general reference number 10. The system 10 includes at least two hubs shown as a first hub 11, second hub 12, and third hub 13; and at least one mobile unit shown as a first mobile unit 21, second mobile unit 22, and third mobile unit 23. The hubs 11–13 and the mobile units 21–23 are time synchronized for transmitting and receiving signals in non-overlapping time slots. The time slots are distinguished as dedicated time slots and operational time slots as illustrated in FIG. 4 and described in the accompanying detailed description below. Each of the hubs 11–13 has its own channel for transmitting and receiving signals with the mobile units 21–23. The mobile units 21–23 tune to the hub channels for receiving and transmitting with the hubs 11–13. Preferably, the hub channels are frequency channels or slow frequency hopping channels where each time slot has a hop frequency as illustrated in FIG. 5 and described in the accompanying detailed description below. However, other types of channels, such as fast frequency hopping where each time slot has a frequency hop pattern, slow or fast phase code modulation, time division, or the like, could be used.

The hubs 11–13 use the dedicated time slots in a sequence for transmitting respective selection signals 31–33. The mobile units 21–23 determine which of the hubs 11–13 with which to communicate based upon signal quality or information in the selection signals 31–33. As an exemplary case, the first mobile unit 21 receives the selection signals 31–33 and compares one or more characteristics of the selection signals 31–33 for determining a particular one of the hubs 11–13 with which to communicate. The characteristic may be a signal quality characteristic, such as data error rate, signal strength, signal-to-noise ratio, signal-to-interference ratio, signal-to-noise plus interference ratio, or the like; or a hub characteristic such as signal loading on the associated hub 11–13 or the like. Then, the mobile unit 21 communicates in both directions during the operational time slots with the particular selected hub 11, 12, or 13 with an associated operational signal 41, 42, or 43, respectively. The sequence of the dedicated and the operational time slots cycles repetitively for enabling the mobile unit 21 to periodically update its selection of the one of the hubs 11–13 with which it communicates. The process is the same for the mobile units 22 and 23 with the understanding that due to distance, blockage, multipath, or interference from other signals, not all the mobile units 21–23 will necessarily receive all the selection signals 31–33. Certain message data is selected for its importance to be included in all of the selection signals 31–33. This redundant transmission increases the likelihood that the selected important information is received by each of the mobile units 21–23.

The hubs 11–13 are interconnected to a hub controller 46 over a communication line 48. The communication line 48 may be hard wired or wireless and be local or use telephone lines, dedicated lines, satellite links, or the like. In a preferred embodiment, the system 10 includes a precise positioning global position system (GPS) reference receiver 50 at a precisely known geographical location. The precise positioning GPS reference receiver 50 may have any of several embodiments. In a first embodiment, the precise positioning GPS reference receiver 50 determines differential GPS (DGPS) information for the differences between pseudoranges or location coordinates that it determines from current GPS signals from several GPS satellites and the pseudoranges or location coordinates for the known geographical location. In a second embodiment, precise positioning GPS reference receiver 50 observes the phases of the carriers of the GPS signal from several GPS satellites. The precise positioning GPS reference receiver 50 then provides the DGPS and/or GPS phase information, the times that the DGPS and/or GPS phase information was determined, and the GPS satellites that were used for the determination over the communication line 48 to the hubs 11–13. Preferably, the DGPS and/or GPS phase observable precise positioning (PPGPS) information is included in the message data in all of the selection signals 31–33 in order to increase the likelihood that it is received by each of the mobile units 21–23.

Figure 2:
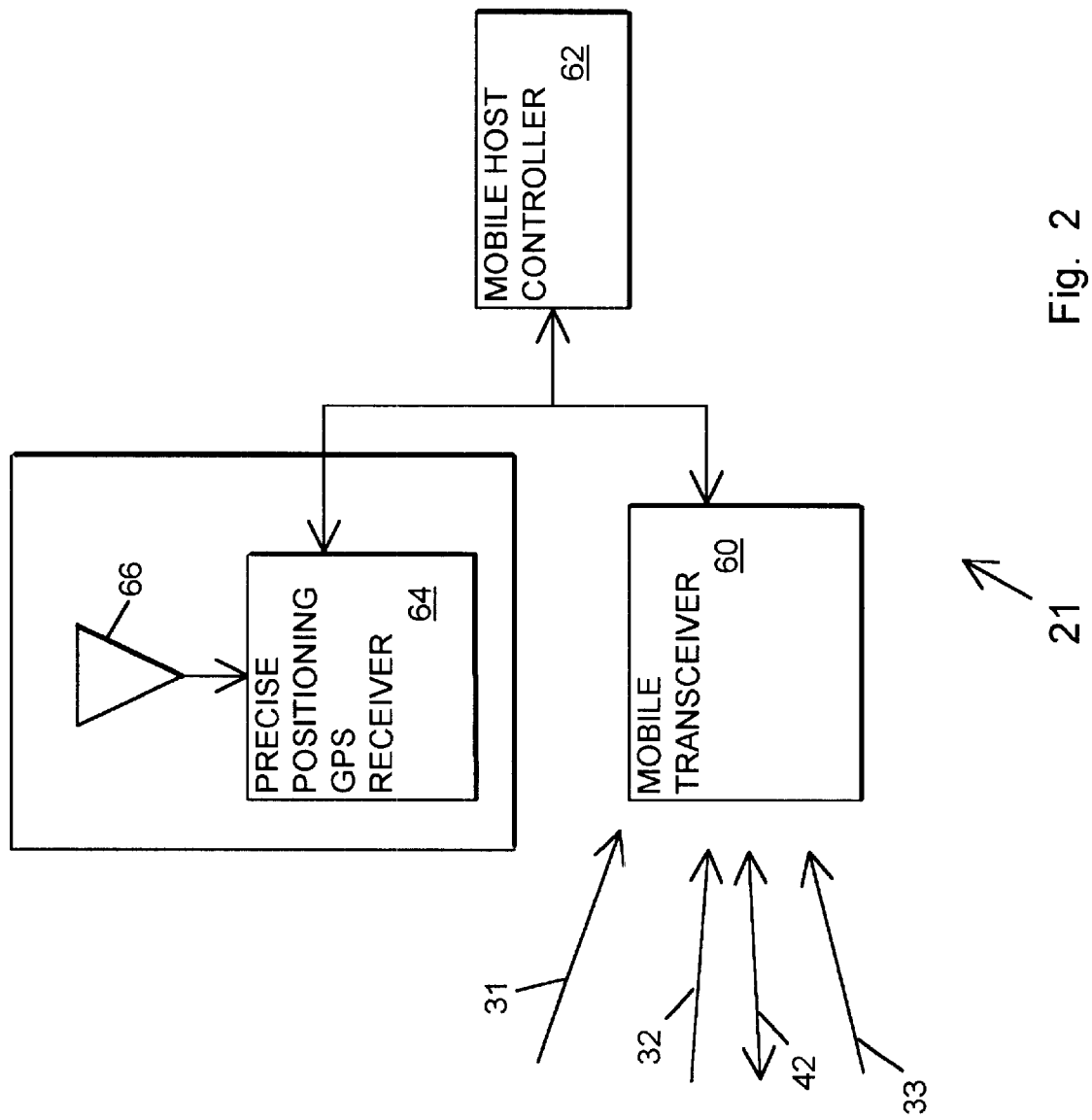
FIG. 2 is a block diagram of a mobile unit of the present invention in the communication system of FIG. 1.

FIG. 2 is a block diagram of the exemplary first mobile unit 21 of the present invention. In the system 10 there will typically be several other nearly identical mobile units (as illustrated by mobile units 22 and 23 in FIG. 1). The first mobile unit 21 includes a mobile transceiver 60, a mobile host controller 62, and preferably a precise positioning GPS remote receiver 64 including a GPS antenna 66. The transceiver 60 receives selection signals 31–33 and transmits and receives a selected particular one of the operational signals 41–43 (FIG. 1). In an exemplary case illustrated in FIG. 2, the mobile unit 21 selects second hub 12 (FIG. 1) and communicates with the operational signal 42, based upon a characteristic of the selection signal 32 as compared to the selection signals 31 and 33.

The precise positioning GPS remote receiver 64 receives a GPS signal from several GPS satellites and computes GPS-based local location information for the GPS antenna 66. The mobile controller 62 receives requests from a user, provides information to the user, and controls the transceiver 60 and the precise positioning GPS remote receiver 64. Either the mobile controller 62 or the precise positioning GPS remote receiver 64 uses the GPS-based local location information and the PPGPS information from the precise positioning GPS reference receiver 50 (FIG. 1) for determining a precise local location of the GPS antenna 66.

Figure 3:
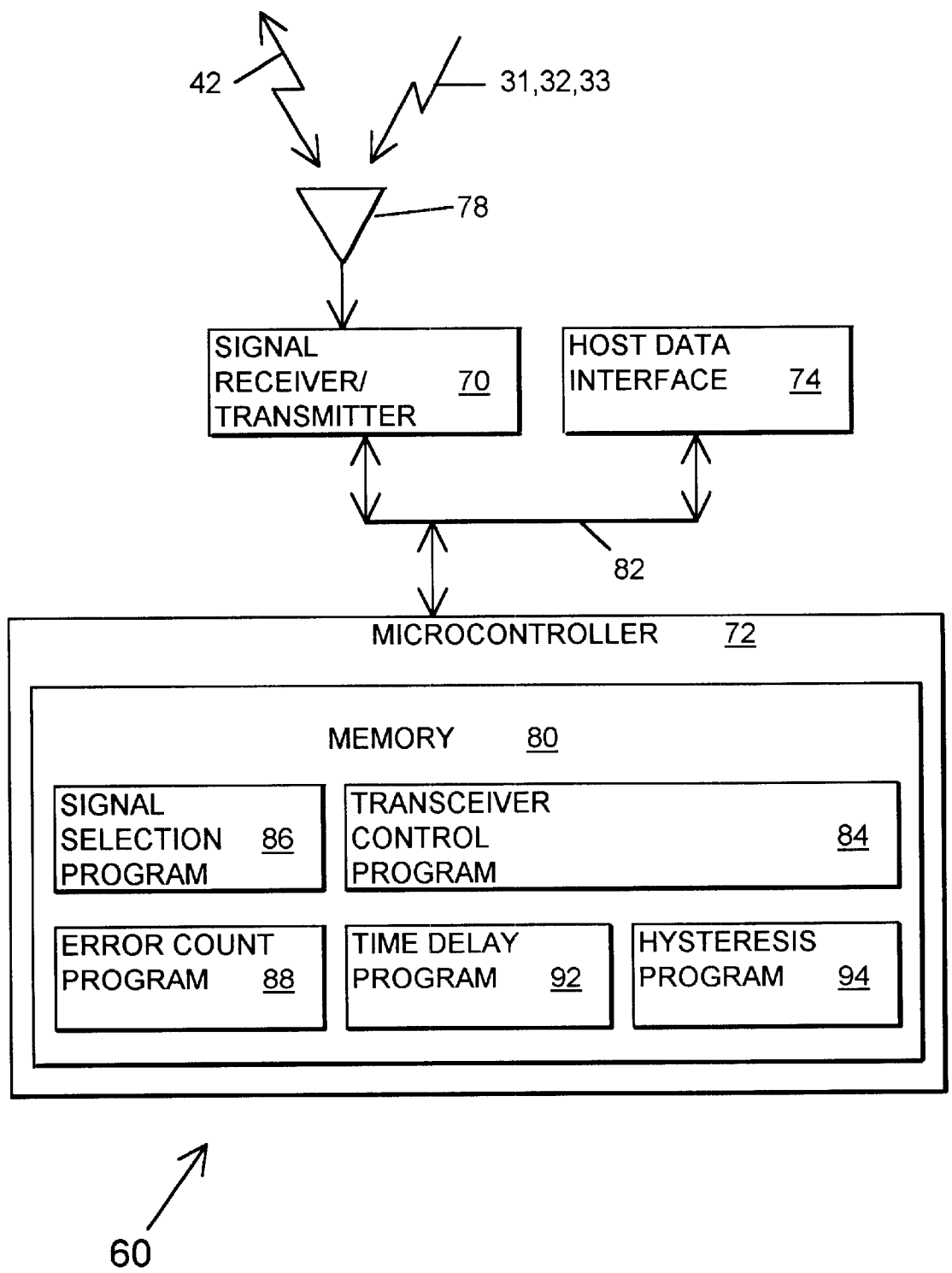
FIG. 3 is a block diagram of a transceiver of the mobile unit of FIG. 2.

FIG. 3 is a block diagram of the mobile transceiver 60 of the present invention. The mobile transceiver 60 includes a signal receiver/transmitter 70, a microcontroller 72, and host data interface 74. The signal receiver/transmitter 70 receives selection signals 31–33; and receives and transmits, in an exemplary case, the operational signal 42 through an antenna 78. The host data interface 74 connects the transceiver 60 to the mobile host controller 62 (FIG. 2). The microcontroller 72 reads and writes to a memory 80 and uses a signal bus 82 for receiving signals from and issuing signals to the signal receiver/transmitter 70 and the host data interface 74 in a conventional manner. The memory 80 includes an executable transceiver control program 84 for directing the overall operation of the microcontroller 72. The transceiver control program 84 includes programming for time synchronizing the transceiver 60 to the dedicated and operational time slots (FIG. 4) and frequency synchronizing the transceiver 60 to the hub channels (FIG. 5).

The transceiver control program 84 calls upon a signal selection program 86 for using one or more characteristics in the selection signals 31–32 for selecting the particular one of the hubs 11–13 with which the mobile unit 21 is to communicate using one of the associated operational signal 41–43, respectively. Preferably, the selection characteristic is data error rate determined using forward error correction techniques over several repetitive cycles of the sequential time slots (FIG. 4). In an exemplary case, the signal selection program 86 selects the particular hub 12 and communicates on the channel (FIG. 5) associated with that hub 12 with operational signal 42. The signal selection program 86 calls upon an error count program 88 for counting data errors in the respective selection signals 31–33. In order to ensure that the system 10 not be whipsawed back and forth by changing hubs 11–13 at unnecessarily frequent intervals the memory 80 further includes a time delay program 92 or a hysteresis program 94 or both. The time delay program 92 inhibits the signal selection program 86 from changing its selection until a selected time elapses following the last previous change of selection. The hysteresis program 94 inhibits the signal selection program 86 from changing its selection unless the error rate of the currently selected hub 12 is greater than a selected threshold.

FIG. 4 is a time line showing the repeating sequence of time slots for the dedicated time slots and the operational time slots. In dedicated time slot 1, the first hub 11 transmits the first selection signal 31 on the first hub channel. Similarly, in dedicated time slots 2 and 3, the second hub 12 and the third hub 13, respectively, transmit the second selection signal 32 on the second hub channel and the third selection signal 33 on the third hub channel, respectively. In the operational time slots 4–20, each of the mobile units 21–23 communicates with the particular hub 11, 12, or 13 with operational signals 41, 42, or 43, respectively, on the respective hub channel (FIG. 5). The pattern of sequential time slots continues repetitively. In a preferred embodiment each time slot is fifty milliseconds and the pattern of dedicated and operational time slots repeats at one second.

FIG. 5 is a frequency versus time graph showing a frequency hopping hub channel for the exemplary second hub 12 (FIG. 1) repeating a pattern of transmitting the selection signal 32 during dedicated time slot 2 and receiving or transmitting the operational signal 42 as required during operational time slots 4–20. The second hub 12 frequency hops in a pseudorandom pattern at time slot 2 for the selection signal 32 and then at time slots 4–20 for the operational signal 42. The operational signal 42 may be transmitted or received in a half-duplex manner on the current frequency for that slot 4–20. During dedicated time slots 1 and 3, the hub 12 does not transmit in order to not interfere with the selection signals 31 and 33 from hubs 11 and 13, respectively. The mobile units 21–23 tune for receiving all of the selection signals 31–33 and then tune for transmitting and receiving the operational signal 41, 42, or 43 associated with the respective hub 11, 12, or 13 that has been selected. Each of the mobile units 21–23 that has selected the second hub 12 also frequency hops using the same pattern and at the same times. Contention between mobile units 21–23 during the operational time slots 4–20 may be resolved in a conventional manner such as an ALOHA protocol. Such frequency hopping having one hop frequency for each time slot is sometimes termed "slow" frequency hopping. Of course, several alternative hub channel types will be obvious to those skilled in the art of radio communications that could be used with the present invention, such as fixed frequencies, "fast" frequency hopping where a frequency hopping pattern is applied within the time slots, slow or fast phase code modulation, time divisions, or the like.

Figure 6:
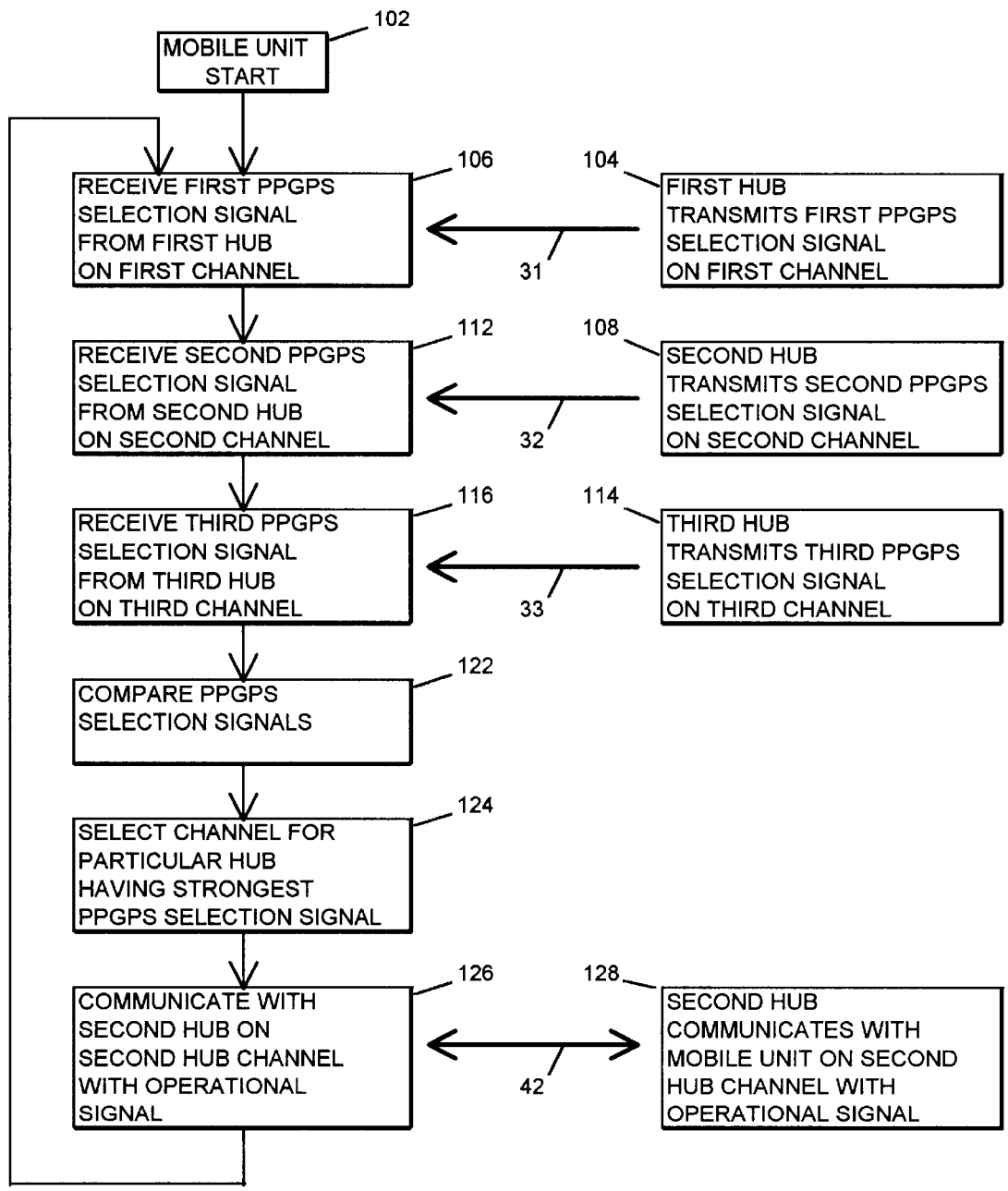
FIG. 6 is a flow chart of a method of the present invention for the communication system of FIG. 1.

FIG. 6 is a flow chart of the operation of the system. At a step 102 the exemplary first mobile unit 21 starts. In a step 104 the first hub 11 transmits the selection signal 31, termed the first PPGPS selection signal, including the precise positioning global positioning system (PPGPS) information. In a step 106 the first mobile unit 21 receives the PPGPS selection signal on the hub channel associated with the first hub 11. Similarly, in a step 108 the second hub 12 transmits the selection signal 32, termed the second PPGPS selection signal, including the PPGPS information; and in a step 112 the first mobile unit 21 receives the second PPGPS selection signal on the hub channel associated with the second hub 12. Similarly, in a step 114 the third hub 13 transmits the selection signal 33, termed the third PPGPS selection signal, including the PPGPS information; and in a step 116 the first mobile unit 21 receives the third PPGPS selection signal on the hub channel associated with the third hub 13. In a step 122, the first mobile unit 21 compares the selection signals 31–33 and in a step 124 selects the hub channel associated with the particular one of the hubs 11–13 having the lowest error rate in the associated selection signals 31–33. In the exemplary case, the second hub 12 is selected. Then, in a step 126 the first mobile unit 21 transmits or receives the operational signal 42 to or from the second hub 12 on the associated second hub channel. And, in a step 128 the selected particular hub 12 receives or transmits back from or to the first mobile unit 21. After the pre-determined number of operational time slots, the process repeats from the step 104.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method in a mobile transceiver for selecting between two or more hub transceivers for communicating with the selected hub transceiver, comprising steps of:

organizing non-overlapping time slots into a repeating sequence of two or more dedicated time slots and operational time slots, wherein said two or more dedicated time slots are fixed within said sequence and the number of said dedicated time slots corresponds to the number of said hub transceivers;

receiving selection signals during said dedicated time slots, said dedicated time slots corresponding respectively to said hub transceivers;

selecting a particular one of said hub transceivers based upon a characteristic of said selection signals; and communicating with said particular hub transceiver with an operational signal during said operational time slots.

2. The method of claim 1, wherein:

said selection signals includes certain message information selected for its importance for transmission from each one of said hub transceivers, whereby said mobile transceiver receives the same said certain message information redundantly from each one of said hub transceivers.

3. The method of claim 2, wherein:

said certain message information includes precise positioning global positioning system (GPS) location determination information for use in a differential determination of a GPS location.

4. The method of claim 1, wherein:

the step of selecting said particular hub transceiver includes determining respective error rates for said selection signals and selecting said particular hub transceiver corresponding to a particular one of said selection signals having a lowest of said error rates.

5. The method of claim 4, further comprising steps of:

repetitively cycling through the steps of receiving said selection signals during said dedicated time slots, selecting said particular hub transceiver, and communicating with said operational signal during said operational time slots; and wherein:

said step of determining said respective error rates includes determining said error rates during several said cycles.

6. The method of claim 4, wherein:

the step of selecting said particular hub transceiver includes inhibiting a new selection of said particular hub transceiver unless said error rate for a current selection of said particular hub transceiver is greater than a selected threshold.

7. The method of claim 1, wherein:

the step of selecting said particular hub transceiver includes inhibiting a new selection of said particular hub transceiver for a selected time period following a last previous change of said particular hub transceiver.

8. The method of claim 1, wherein:

the step of receiving said selection signals includes tuning to a respective channel in each of said dedicated time slots, each said channel corresponding to a one of said hub transceivers, respectively; and the step of communicating said operational signal includes communicating with said operational signal with said particular hub transceiver on a particular said channel corresponding to said particular hub transceiver that is selected.

9. The method of claim 8, wherein:

said channel is a frequency channel having a respective frequency.

10. The method of claim 9, further comprising a step of:

selecting said respective frequency for each of said non-overlapping time slots according to a frequency hop code, each of said hub transceivers having a certain said frequency hop code.

11. A mobile transceiver for selecting between two or more hub transceivers for communicating with the selected hub transceiver, comprising:

a signal receiver for receiving selection signals in dedicated time slots corresponding respectively to said hub transceivers;

a microcontroller coupled to the signal receiver and including a transceiver control program for synchronizing with a repeating sequence of non-overlapping time slots organized as two or more said dedicated time slots for receiving said selection signals and operational time slots for communicating with an operational signal; and a signal selection program for selecting a particular one of said hub transceivers based upon a characteristic of said selection signals, wherein said two or more dedicated time slots are fixed within said sequence and the number of said dedicated time slots are fixed within said sequence and the number of said dedicated time slots corresponds to the number of said hub transceivers; and a signal transmitter coupled to the microcontroller for transmitting said operational signal associated with said particular hub transceiver during at least one of said operational time slots.

12. The mobile transceiver of claim 11, wherein:

said selection signals includes certain message information selected for its importance for transmission from each one of said hub transceivers, whereby the mobile transceiver receives the same said certain message information redundantly from each one of same hub transceivers.

13. The mobile transceiver of claim 12, wherein:

said certain message information includes precise positioning global positioning system (GPS) location determination information for use in a differential determination of a GPS location.

14. The mobile transceiver of claim 11, wherein:

said signal selection program includes an error counter for providing respective error counts for said selection signals, said signal selection program for selecting said particular hub transceiver by comparing said error counts and selecting said particular hub transceiver corresponding to a particular one of said selection signals having a lowest of said error counts.

15. The mobile transceiver of claim 14, wherein:

the microcontroller is further for organizing said non-overlapping time slots for repetitively cycling between said dedicated time slots and said operational time slots; and said error counter is further for accumulating said error counts during several said cycles.

16. The mobile transceiver of claim 14, wherein:

said signal selection program further includes a hysteresis code for inhibiting a new selection of said particular hub transceiver unless said error rate for a current selection of said particular hub transceiver is greater than a selected threshold.

17. The mobile transceiver of claim 11, wherein:

said signal selection program further includes a time delay code for inhibiting a new selection of said particular hub transceiver for a selected time period following a last previous change of said particular hub transceiver.

18. The mobile transceiver of claim 11, wherein:

the signal receiver is for tuning to a respective channel in each of said dedicated time slots, each said channel corresponding to a one of said hub transceivers, respectively; and said signal transmitter is further for transmitting said operational signal to said particular hub transceiver on a particular said channel corresponding to said particular hub transceiver.

19. The mobile transceiver of claim 18, wherein:

said channel is a frequency channel, each said frequency channel having a respective frequency.

20. The mobile transceiver of claim 19, wherein:

the microcontroller further includes a transceiver control program coupled to the signal receiver and the signal transmitter for selecting said respective frequency for each of said non-overlapping time slots according to a frequency hop code, each of said hub transceiver having a certain said frequency hop code.

* * * * *